United States Patent [19]

Smith

[11] Patent Number: 5,218,403
[45] Date of Patent: Jun. 8, 1993

[54] PHOTO VIDEO COPIER APPARATUS

[76] Inventor: William H. Smith, 55 Della Ave., Pompton Plains, N.J. 07444

[21] Appl. No.: 861,649

[22] Filed: Apr. 11, 1992

[51] Int. Cl.⁵ .............. G03B 27/32; G03B 27/52
[52] U.S. Cl. .............................. 355/39; 352/90;
352/87; 352/243; 354/80; 354/81; 354/293
[58] Field of Search ................... 352/90, 87, 243;
355/39; 354/80, 81, 293

[56] References Cited
U.S. PATENT DOCUMENTS

| | | | |
|---|---|---|---|
| 904,613 | 11/1908 | Hatt | 352/243 |
| 1,845,294 | 2/1932 | La Grande | 352/90 |
| 2,168,688 | 8/1939 | Simms | 352/90 |
| 2,235,355 | 3/1941 | Brown | 352/90 |
| 3,165,025 | 1/1965 | Hart | 354/293 |
| 3,452,663 | 7/1969 | Machtig | 352/243 |
| 4,336,996 | 6/1982 | Cattelani et al. | 355/39 |

Primary Examiner—Monroe H. Hayes
Attorney, Agent, or Firm—Leon Gilden

[57] ABSTRACT

An apparatus including a support bar linearly aligned with a platform mounted at a forward distal end of the support bar, with the support bar including a forward support plate arranged parallel to and spaced from a rear support plate extending downwardly relative to a rear distal end of the platform, with the support bar and platform including a bottom surface canted downwardly. The platform is arranged to mount a camcorder thereon for alignment with a photograph mounted to a mounting plate that is orthogonally mounted to a top wall of a slide bar slidably oriented relative to the support bar. The mounting plate is laterally offset relative to the slide bar to align the mounting plate relative to an optical lens of an associated camcorder mounted to the platform.

1 Claim, 4 Drawing Sheets

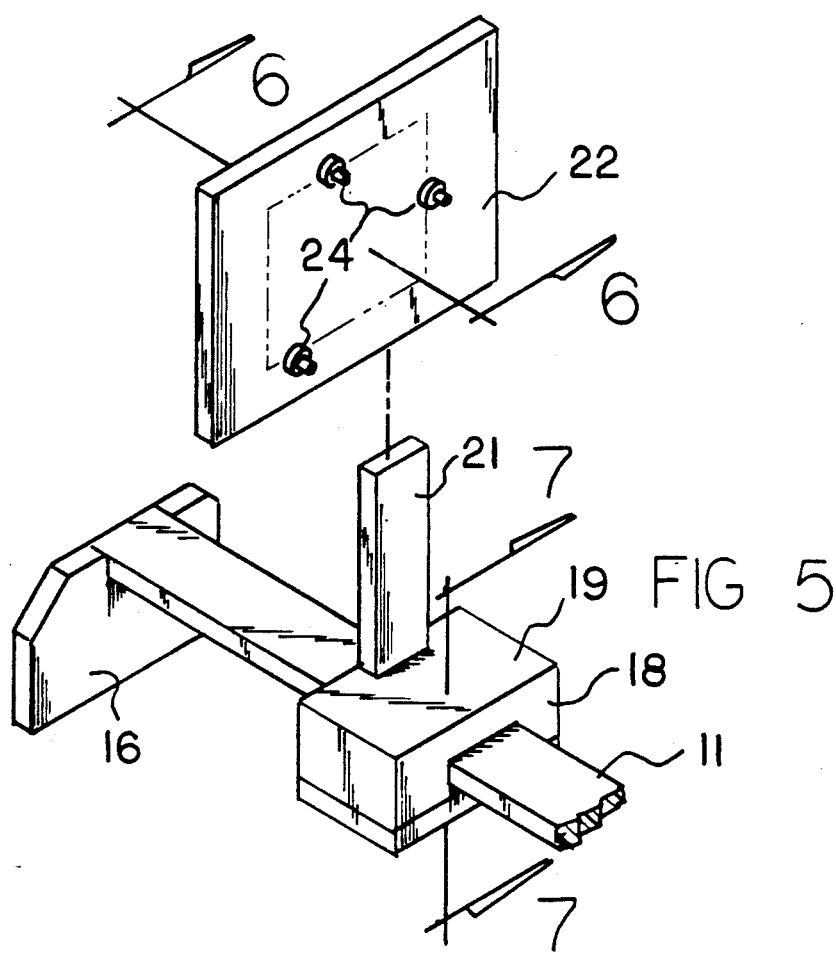
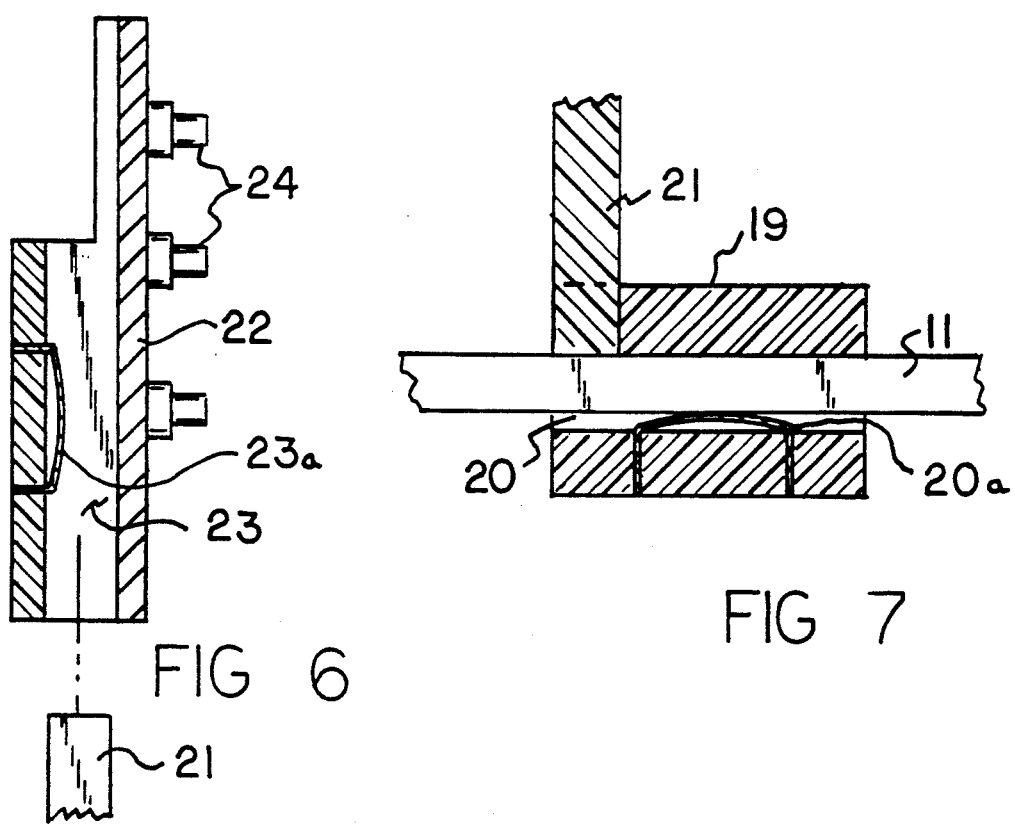

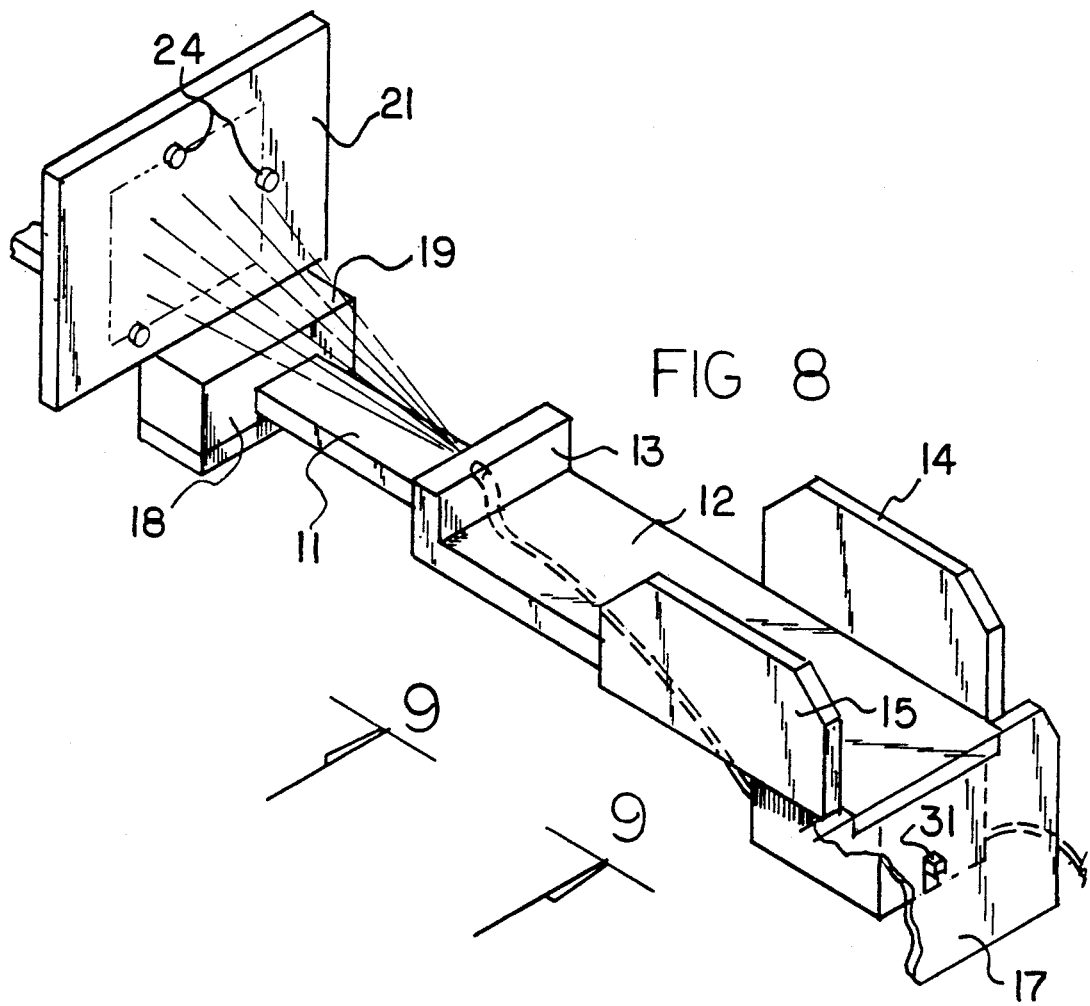
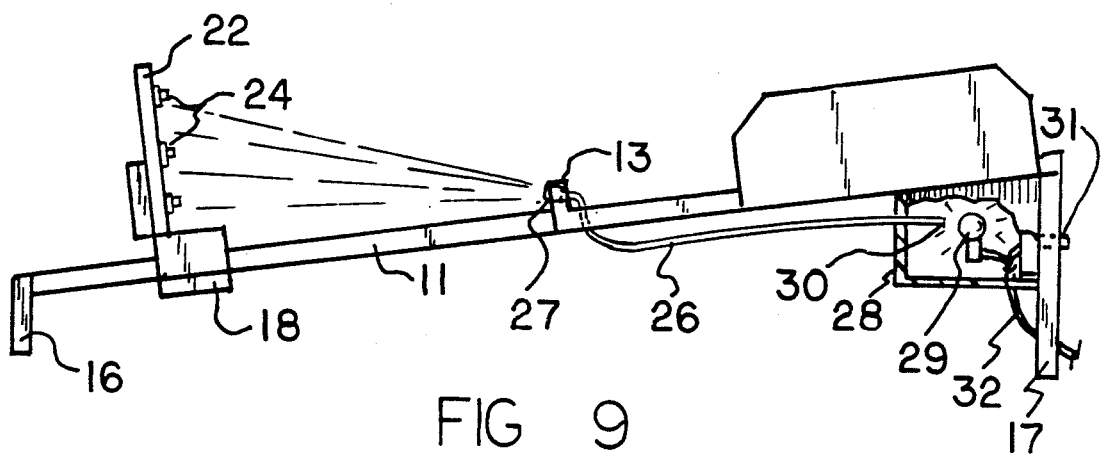

PHOTO VIDEO COPIER APPARATUS

BACKGROUND OF THE INVENTION

1. Field of the Invention

The field of invention relates to video apparatus, and more particularly pertains to a new and improved photo video copier apparatus wherein the same is arranged for mounting of a video camera in alignment with a photograph for use in a video display.

2. Description of the Prior Art

Various video equipment is arranged in the prior art to align visual images, wherein such is set forth in U.S. Pat. No. 4,949,108 to Verrett.

U.S. Pat. No. 4,233,634 to Adams sets forth a video camera, including an adjustable mount and counter-balance relative to the camera support.

The U.S. Pat. No. 4,577,827 to Eliscu sets forth a camera holder to include a movable housing and a cage rotatable and movable within the housing, with the camera arranged for securement to the movable cage.

U.S. Pat. No. 3,699,252 to Jackson sets forth a photograph equipment alignment wherein a camera is mounted relative to an underlying table structure.

As such, it may be appreciated that there continues to be a need for a new and improved photo video copier apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of copier apparatus now present in the prior art, the present invention provides a photo video copier apparatus wherein the same is arranged to align a photograph relative to an optical lens of a video camera for inclusion of the photograph within a video reel. As such, the general purpose of the present invention, which will be described subsequently in greater detail, is to provide a new and improved photo video copier apparatus which has all the advantages of the prior art video copier apparatus and none of the disadvantages.

To attain this, the present invention provides an apparatus including a support bar linearly aligned with a platform mounted at a forward distal end of the support bar, with the support bar including a forward support plate arranged parallel to and spaced from a rear support plate extending downwardly relative to a rear distal end of the platform, with the support bar and platform including a bottom surface canted downwardly. The platform is arranged to mount a camcorder thereon for alignment with a photograph mounted to a mounting plate that is orthogonally mounted to a top wall of a slide bar slidably oriented relative to the support bar. The mounting plate is laterally offset relative to the slide bar to align the mounting plate relative to an optical lens of an associated camcorder mounted to the platform.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved photo video copier apparatus which has all the advantages of the prior art video copier apparatus and none of the disadvantages.

It is another object of the present invention to provide a new and improved photo video copier apparatus which may be easily and efficiently manufactured and marketed.

It is a further object of the present invention to provide a new and improved photo video copier apparatus which is of a durable and reliable construction.

An even further object of the present invention is to provide a new and improved photo video copier apparatus which is susceptible of a low cost of manufacture with regard to both materials and labor, and which accordingly is then susceptible of low prices of sale to the consuming public, thereby making such photo video copier apparatus economically available to the buying public.

Still yet another object of the present invention is to provide a new and improved photo video copies apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an isometric illustration setting forth the association of the mounting plate relative to the mounting bar.

FIG. 6 is an orthographic view, taken along the lines 6—6 of FIG. 5 in the direction indicated by the arrows.

FIG. 7 is an orthographic view, taken along the lines 7—7 of FIG. 5 in the direction indicated by the arrows.

FIG. 8 is an isometric illustration of a modification of the invention.

FIG. 9 is an orthographic view, taken along the lines 9—9 of FIG. 8 in the direction indicated by the arrows, illustrating the orientation of the fiber optic cable relative to the apparatus.

DESCRIPTION OF THE PREFERRED EMBODIMENT

Figure 1:
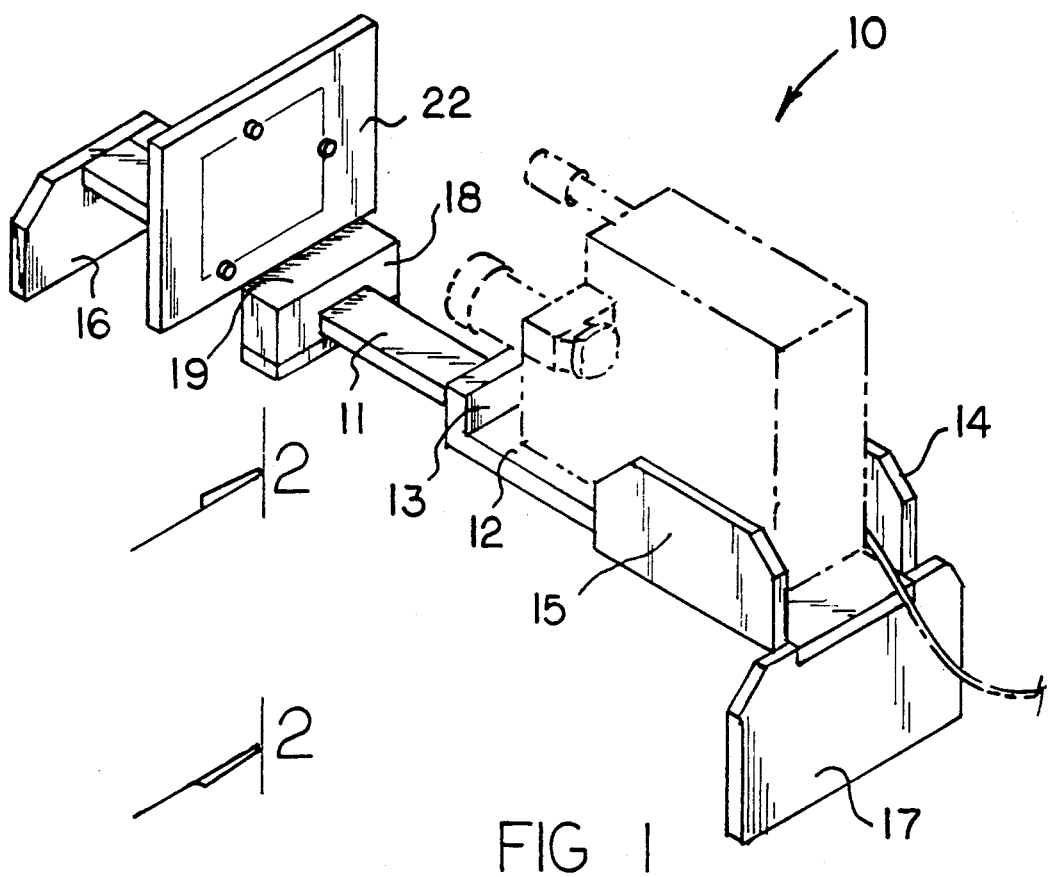
FIG. 1 is an isometric illustration of the instant invention.
Figure 2:
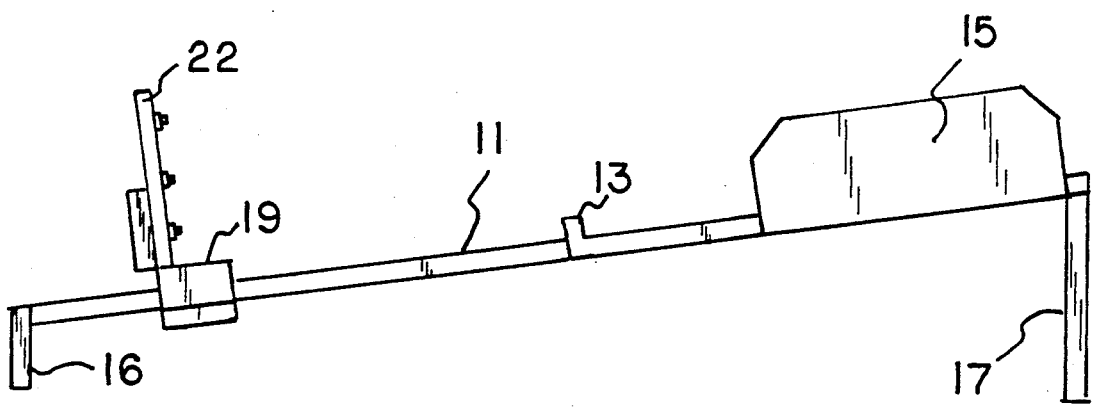
FIG. 2 is an orthographic side view of the invention, taken along the lines 2—2 of FIG. 1 in the direction indicated by the arrows.
Figure 3:
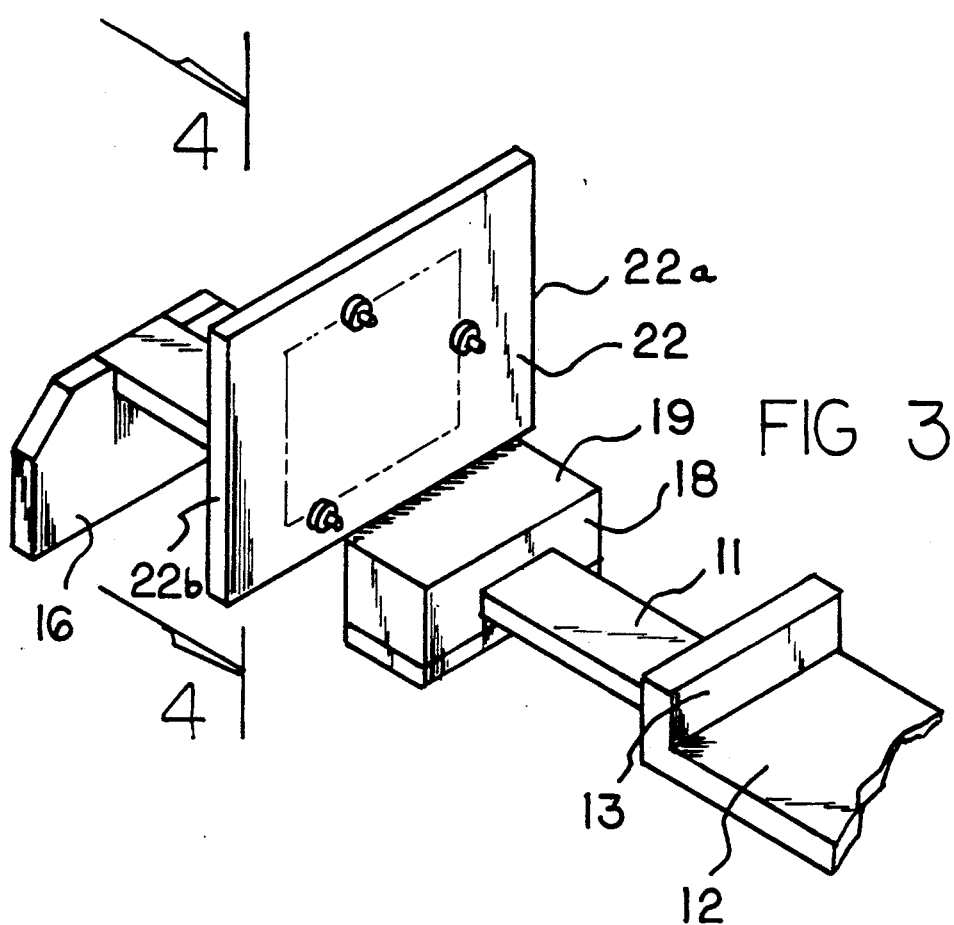
FIG. 3 is an isometric enlarged illustration of a forward portion of the invention.
Figure 4:
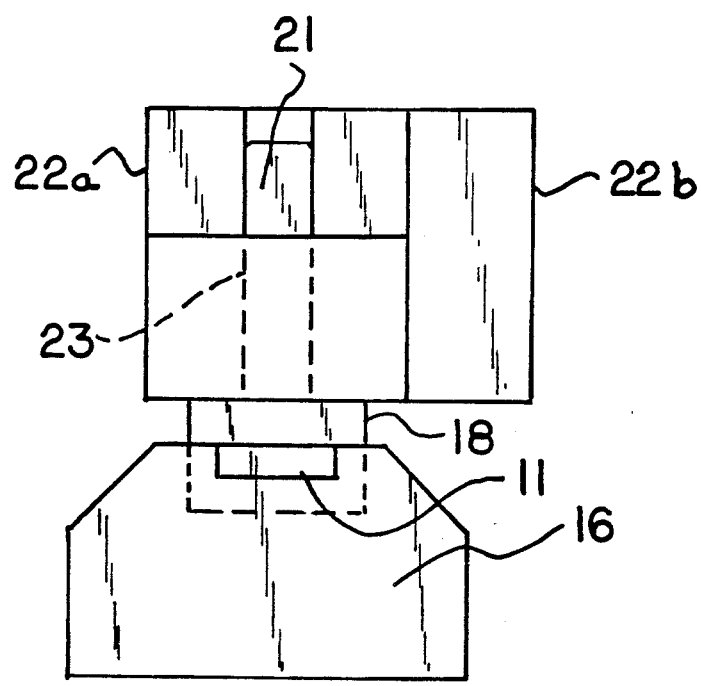
FIG. 4 is an orthographic view, taken along the lines 4—4 of FIG. 3 in the direction indicated by the arrows.

With reference now to the drawings, and in particular to FIGS. 1 to 9 thereof, a new and improved photo video copier apparatus embodying the principles and concepts of the present invention and generally designated by the reference numeral 10 will be described.

More specifically, the photo video copier apparatus 10 of the instant invention essentially comprises an elongate linearly aligned support bar 11, including a first end integrally mounted to a platform 12, with the platform 12 and the support bar 11 arranged in a linearly aligned relationship to include a bottom surface of the support bar and platform in a coplanar relationship. The platform 12 includes an abutment flange 13 orthogonally directed relative to the platform and the support bar 11 at an intersection of the support bar 11 and the platform 12 for abutment of a video camera, such as a type as illustrated in FIG. 1, when mounted upon a platform. Respective right and left alignment plates 14 and 15 arranged in a parallel relationship on opposed right and left sides of the platform 12 contain the video camera in a predetermined aligned relationship relative to the support bar 11 during use. A forward support plate 16 extends downwardly from a second distal end of the support bar 11 spaced from the platform, with the platform including a rear support plate 17 oriented parallel relative to the forward support plate 16. The forward support plate 16 is of a first height, with the rear support plate 17 of a second height substantially greater than the first height to cant the support bar and platform an inclination towards the forward support plate 16, as illustrated.

A slide bar 18 includes a slide bar top wall 19 oriented parallel relative to the support bar, with the slide bar 18 including a slide bar bore 20 oriented parallel relative to the top wall 19 and the support bar 11. The slide bar bore 20 includes a first bore spring 20a contained therewithin to frictionally maintain the slide bar 18 at a predetermined orientation along the support bar 11. A mounting rod 21 is orthogonally mounted to the slide bar top wall 19 and includes a mounting plate 22 slidably directed along the mounting rod 21, with a mounting plate 22 orthogonally oriented relative to the support bar 11 and having a mounting plate bore 23 extending parallel relative to the mounting plate 22, with the mounting plate bore including a second bore spring 23a therewithin for abutment with the mounting rod 21 to maintain vertical alignment and positioning of the mounting plate relative to the mounting rod 21. Further it should be noted that the mounting plate 22 includes a mounting plate first side 22a and a mountting plate second side 22b, with the mounting plate bore 23 oriented closer to the mounting plate first side 22a to displace laterally the mounting plate 22 relative to the support bar for proper alignment of a photograph relative to a typically offset camera lens in a video recorder, such as a type as illustrated in FIG. 1 in phantom. A plurality of clamp members 24 are mounted in a predetermined pattern to the mounting plate's forward surface, where it should be noted that the mounting plate bore 23 is positioned within a bore housing mounted to a rear surface of the mounting plate 22.

The FIGS. 8 and 9 further utilize a fiber optic cable 26 having a forward free end 27 directed through the abutment flange 13 longitudinally aligned medially of the predetermined pattern of clamp members 24 to permit proper alingment of a photograph within the clamp members. A fiber optic cable rear end 30 is directed into an illumination housing 28 mounted below the platform, with the illumination housing 28 including an illumination bulb 29 having the fiber optic cable rear free end 30 positioned proximate the illumination bulb 29 to direct illumination selectively through the fiber optic cable and the fiber optic cable forward free end 27 onto the forward surface of the mounting plate 22, in a manner as illustrated in FIG. 9 for example. An on/off switch 31 mounted from the illumination housing 28 is arranged for selective actuation of the illumination bulb 29, with an electrical supply cable 32 providing electrical energy to the illumination bulb 29 in a conventional manner.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A photo video copier apparatus, comprising,
    a support bar, the support bar longitudinally aligned and including a support bar first end and a support bar second end, and
    a support platform, the support bar longitudinally aligned with the support platform, with the support bar first end integrally mounted to the support platform, and the support bar second end including a forward support plate extending downwardly relative to the support bar, and the support platform including a support platform rear distal end, with the support platform rear distal end including a rear support plate extending downwardly relative to the support platform rear distal end, with the forward support plate arranged parallel relative to the rear support plate, and the support bar including a slide bar slidably receiving the support bar therethrough, with the slide bar including a mounting plate for mounting a photograph thereon, and the forward support plate is defined by a first height and the rear support plate is defined by a second height, with the second height substantially greater than the first height to cant the support bar and the support platform downwardly towards the forward support plate, and the support platform includes an abutment flange integrally mounted to the support platform at an intersection of the support bar first end and the platform, with the abutment flange orthogonally oriented relative to the support bar, and the support platform including a right alignment plate and a left alignment plate integrally mounted to a top surface of the support platform, with the right and left alignment plates spaced parallel relative to one another to receive a video camera therebetween, with the video camera arranged for abutment with the abutment flange, and slide bar includes a slide bar top wall, the slide bar top wall oriented parallel relative to the support bar, and the slide bar further including a slide bar bore, with the slide bore oriented parallel to the top wall and to the support bar, and a first bore spring mounted within the first bore in abutment with the support bar to frictionally maintain the slide bar relative to the support bar in a predetermined orientation, and the slide bar further includes a mounting rod integrally and orthogonally mounted to the top wall, and the mounting plate includes a mounting plate bore housing integrally mounted to a rear surface of the mounting plate, with the mounting plate bore housing including a mounting plate bore directed therethrough, the mounting plate bore oriented parallel relative to the mounting plate, and the mounting plate includes a mounting plate first side and a mounting plate second side, with the first and second sides arranged orthogonally oriented relative to the support bar, and wherein the mounting plate bore is positioned closer to the mounting plate first side to laterally displace the mounting plate relative to the support bar for alignment of a forward surface of the mounting plate relative to a lens portion of the video camera, and the mounting plate includes a mounting plate forward surface, and the mounting plate forward surface includes a plurality of clamp members mounted thereon, and an illumination housing mounted to the platform at a bottom surface thereof adjacent the rear support plate, the illumination housing including an illumination bulb contained therewithin, and an on/off switch arranged for selective actuation of the illumination bulb, and a fiber optic cable, the fiber optic cable including a fiber optic cable rear end directed into the illumination housing adjacent the illumination bulb, and the fiber optic cable directed along the platform and directed through the platform abutment flange, with the fiber optic cable including a fiber optic cable forward end projecting through the platform abutment flange longitudinally aligned medially of the clamp members.

* * * * *